(12) United States Patent
Mi et al.

(10) Patent No.: US 12,308,673 B2
(45) Date of Patent: May 20, 2025

(54) ACTIVE EQUALIZER CIRCUIT, BATTERY MANAGEMENT SYSTEM, AND POWER SUPPLY SYSTEM

(71) Applicants: Hefei Gotion High-Tech Power Energy Co., Ltd., Hefei (CN); San Diego State University, San Diego, CA (US)

(72) Inventors: Chunting Chris Mi, San Diego, CA (US); Panpan Hu, Hefei (CN); Yunlong Shang, Jinan (CN); Bing Han, Hefei (CN); Yuhong Fu, San Diego, CA (US); Xiaohong Hu, Hefei (CN); Dingguo Wu, Hefei (CN)

(73) Assignees: Hefei Gotion High-Tech Power Energy Co., Ltd., Hefei (CN); San Diego State University, San Diego, CA (US)

( * ) Notice: Subject to any disclaimer, the term of this patent is extended or adjusted under 35 U.S.C. 154(b) by 789 days.

(21) Appl. No.: 17/441,598

(22) PCT Filed: Mar. 20, 2019

(86) PCT No.: PCT/CN2019/078967
§ 371 (c)(1),
(2) Date: Sep. 21, 2021

(87) PCT Pub. No.: WO2020/186496
PCT Pub. Date: Sep. 24, 2020

(65) Prior Publication Data
US 2022/0416549 A1    Dec. 29, 2022

(51) Int. Cl.
*H02J 7/00* (2006.01)
*H01M 10/42* (2006.01)
(Continued)

(52) U.S. Cl.
CPC ....... *H02J 7/0016* (2013.01); *H01M 10/4207* (2013.01); *H02J 7/0019* (2013.01);
(Continued)

(58) Field of Classification Search
CPC .... H02M 3/33576; H02M 3/158; H02M 7/21; H02J 7/0047; H02J 7/007182;
(Continued)

(56) References Cited

U.S. PATENT DOCUMENTS 4,809,151 A * 2/1989 Ota ............... H02M 3/335
363/71
5,646,504 A * 7/1997 Feldstein ........... H02J 7/0018
320/DIG. 22

(Continued)

FOREIGN PATENT DOCUMENTS

CN    204244074 U  *  4/2015
CN    104917239 A  *  9/2015
(Continued)

OTHER PUBLICATIONS

CN108565831_Description_Machine_Translation (Year: 2018).*
(Continued)

*Primary Examiner* — John T Trischler
(74) *Attorney, Agent, or Firm* — LOZA & LOZA, LLP; Michael F. Fedrick

(57) ABSTRACT

Embodiments of the present disclosure provide an active equalizer circuit, a battery management system, and a power supply system. The active equalizer circuit comprises a plurality of switching transistors, a driving transformer, a multi-port converter, a buck converter, and a microcontroller. Each of the switching transistors is coupled to a battery cell in the series battery pack on a one-to-one basis. The multi-port converter comprises an equalizing transformer and a bridge converter. The microcontroller is con-
(Continued)

figured to output a first control signal to the buck converter, to facilitate the buck converter to transform an output voltage of the series battery pack and output the transformed output voltage to the bridge converter, and output a second control signal to the bridge converter, to control an operation state of the bridge converter.

21 Claims, 7 Drawing Sheets

(51) Int. Cl.
  *H02M 3/158* (2006.01)
  *H02M 7/219* (2006.01)
  *H02M 3/335* (2006.01)
(52) U.S. Cl.
  CPC ...... *H02J 7/0047* (2013.01); *H02J 7/007182* (2020.01); *H02M 3/158* (2013.01); *H02M 7/219* (2013.01); *H02M 2207/20* (2020.01); *H02M 3/33576* (2013.01)
(58) Field of Classification Search
  CPC .... H02J 7/0019; H02J 2207/20; H02J 7/0016; H01M 10/4207
  USPC .......................................................... 320/118
  See application file for complete search history.

(56) References Cited

U.S. PATENT DOCUMENTS

| | | | | |
|---|---|---|---|---|
| 5,659,237 A * | 8/1997 | Divan | B60L 58/15 | 320/DIG. 13 |
| 6,205,036 B1 * | 3/2001 | Anzawa | H02M 3/33584 | 363/20 |
| 6,373,223 B1 * | 4/2002 | Anzawa | H02J 7/0018 | 320/118 |
| 6,642,693 B2 * | 11/2003 | Anzawa | H02J 7/0018 | 320/118 |
| 6,670,789 B2 * | 12/2003 | Anzawa | H02J 7/0018 | 320/118 |
| 7,193,392 B2 * | 3/2007 | King | B60L 58/18 | 320/118 |
| 7,245,108 B2 * | 7/2007 | Chertok | B60L 58/18 | 320/132 |
| 7,378,818 B2 * | 5/2008 | Fowler | H01M 10/441 | 320/108 |
| 7,800,346 B2 * | 9/2010 | Bolz | H02J 7/0014 | 320/167 |
| 7,804,276 B2 * | 9/2010 | Roessler | H02J 7/0016 | 320/118 |
| 7,880,433 B2 * | 2/2011 | Oh | H02J 7/0016 | 320/122 |
| 7,939,965 B2 * | 5/2011 | Oh | H02J 7/0016 | 307/50 |
| 7,982,429 B1 * | 7/2011 | Oh | H02J 7/0016 | 320/122 |
| 8,008,890 B2 * | 8/2011 | Lee | H02J 7/0018 | 320/122 |
| 8,120,322 B2 * | 2/2012 | Lee | H02J 7/0016 | 320/118 |
| 8,217,623 B2 * | 7/2012 | Oh | H02J 7/0016 | 320/118 |
| 8,269,455 B2 * | 9/2012 | Marten | H02M 3/33571 | 324/426 |
| 8,310,204 B2 * | 11/2012 | Lee | H02J 7/0016 | 320/120 |
| 8,339,100 B2 * | 12/2012 | Li | H02J 7/00 | 320/118 |
| 8,541,980 B2 * | 9/2013 | Moussaoui | H02J 7/0016 | 320/118 |
| 8,692,515 B2 * | 4/2014 | Nakao | H02J 7/0016 | 320/118 |
| 8,928,283 B2 * | 1/2015 | Nakao | H01M 10/441 | 320/149 |
| 8,957,625 B2 * | 2/2015 | Li | H01M 10/482 | 320/120 |
| 9,083,189 B2 * | 7/2015 | Wang | H02J 7/0018 | |
| 9,099,870 B2 * | 8/2015 | Marten | H02J 7/0013 | |
| 9,160,185 B2 * | 10/2015 | Potts | H02J 7/0019 | |
| 9,209,630 B2 * | 12/2015 | Naghshtabrizi | H02J 7/0048 | |
| 9,231,420 B2 * | 1/2016 | Jo | H02J 7/0031 | |
| 9,270,132 B2 * | 2/2016 | Yun | H02J 7/0016 | |
| 9,368,977 B2 * | 6/2016 | Liang | H02J 7/02 | |
| 9,397,508 B2 * | 7/2016 | Moussaoui | H02J 7/0019 | |
| 9,397,509 B2 * | 7/2016 | Heidenreich | H02J 7/0014 | |
| 9,478,995 B2 * | 10/2016 | Hayakawa | B60L 53/665 | |
| 9,484,754 B2 * | 11/2016 | Wang | H02J 7/0016 | |
| 9,484,762 B2 * | 11/2016 | Ameziani | H02J 7/0016 | |
| 9,490,639 B2 * | 11/2016 | Mercier | B60L 58/22 | |
| 9,547,351 B2 * | 1/2017 | Kim | G06F 1/32 | |
| 9,667,073 B2 * | 5/2017 | Wu | H02J 7/0014 | |
| 9,685,797 B2 * | 6/2017 | Tofigh | H02J 7/0019 | |
| 9,748,785 B2 * | 8/2017 | Takai | H02J 7/0014 | |
| 9,819,208 B2 * | 11/2017 | Pernyeszi | H01M 10/425 | |
| 9,853,497 B2 * | 12/2017 | Heidenreich | B60L 58/22 | |
| 9,882,491 B2 * | 1/2018 | Ishigaki | B60L 3/003 | |
| 9,887,553 B2 * | 2/2018 | Ichikawa | B60L 53/122 | |
| 10,164,441 B2 * | 12/2018 | Moussaoui | H02J 7/0019 | |
| 10,312,728 B2 * | 6/2019 | Heidenreich | H02J 7/0014 | |
| 10,361,568 B2 * | 7/2019 | Yang | H02J 7/0048 | |
| 10,498,146 B2 * | 12/2019 | Wu | H02J 7/0013 | |
| 10,615,465 B2 * | 4/2020 | Huff | H01M 10/441 | |
| 10,873,207 B2 * | 12/2020 | Heidenreich | B60L 58/19 | |
| 11,043,706 B2 * | 6/2021 | Huff | H01M 50/209 | |
| 11,187,758 B2 * | 11/2021 | Mi | B60L 3/0046 | |
| 11,251,628 B2 * | 2/2022 | Peretz | H02J 7/345 | |
| 11,552,482 B2 * | 1/2023 | Hudson | H02J 7/0047 | |
| 11,588,185 B2 * | 2/2023 | Kunimitsu | H02J 7/0019 | |
| 11,837,961 B2 * | 12/2023 | Ichihashi | H02M 3/33573 | |
| 11,870,366 B2 * | 1/2024 | Chen | H02M 1/0083 | |
| 2002/0109482 A1 * | 8/2002 | Anzawa | H02J 7/0018 | 320/119 |
| 2003/0141843 A1 * | 7/2003 | Anzawa | H02J 7/0018 | 320/118 |
| 2004/0135544 A1 * | 7/2004 | King | B60L 58/18 | 320/116 |
| 2004/0135545 A1 * | 7/2004 | Fowler | H01M 10/441 | 320/118 |
| 2004/0135546 A1 * | 7/2004 | Chertok | B60L 58/18 | 320/118 |
| 2004/0217735 A1 * | 11/2004 | Chitsazan | H02J 7/0018 | 320/116 |
| 2005/0140335 A1 * | 6/2005 | Lee | H02J 7/0018 | 320/118 |
| 2008/0191663 A1 * | 8/2008 | Fowler | H02J 7/0018 | 320/118 |
| 2008/0272735 A1 * | 11/2008 | Roessler | H02J 7/0016 | 320/125 |
| 2008/0278969 A1 * | 11/2008 | Bolz | H02J 7/0018 | 363/17 |
| 2009/0140693 A1 * | 6/2009 | Johnson, Jr. | H02J 7/0016 | 320/116 |
| 2009/0237030 A1 * | 9/2009 | Oh | H02J 7/0016 | 320/108 |
| 2009/0278496 A1 * | 11/2009 | Nakao | H02J 7/0018 | 320/118 |
| 2009/0302803 A1 * | 12/2009 | Oh | H02J 7/0016 | 320/118 |
| 2009/0322155 A1 * | 12/2009 | Oh | H02J 7/0016 | 307/87 |
| 2010/0007308 A1 * | 1/2010 | Lee | H02J 7/0016 | 320/138 |
| 2010/0148726 A1 * | 6/2010 | Lee | H02J 7/0016 | 320/118 |
| 2010/0207578 A1 * | 8/2010 | Lee | H02J 7/0016 | 320/118 |
| 2010/0295509 A1 * | 11/2010 | Moussaoui | H02J 7/00 | 320/118 |

(56) References Cited

U.S. PATENT DOCUMENTS

| | | | |
|---|---|---|---|
| 2010/0295510 A1* | 11/2010 | Moussaoui | H02J 7/0016 320/121 |
| 2011/0012559 A1* | 1/2011 | Roessler | H02J 7/0016 320/116 |
| 2011/0084668 A1* | 4/2011 | Nakao | H02J 7/0019 320/149 |
| 2011/0140662 A1* | 6/2011 | Li | H02J 7/0016 320/116 |
| 2011/0140663 A1* | 6/2011 | Tofigh | H02J 7/0019 320/116 |
| 2011/0187327 A1* | 8/2011 | Oh | H02J 7/0016 320/118 |
| 2011/0241622 A1* | 10/2011 | Li | H01M 10/482 320/116 |
| 2012/0062038 A1* | 3/2012 | Wang | H02J 7/0018 307/82 |
| 2012/0194137 A1* | 8/2012 | Wang | H02J 7/0016 320/119 |
| 2012/0206095 A1* | 8/2012 | Marten | H01M 10/44 320/107 |
| 2012/0217806 A1* | 8/2012 | Heidenreich | H02J 9/061 320/118 |
| 2012/0293129 A1* | 11/2012 | Naghshtabrizi | H02J 7/0048 320/118 |
| 2012/0313583 A1* | 12/2012 | Oh | H02J 7/0016 320/118 |
| 2013/0002201 A1* | 1/2013 | Bodkin | H02J 7/0016 320/118 |
| 2013/0043842 A1* | 2/2013 | Mercier | H01M 10/46 320/119 |
| 2013/0099723 A1* | 4/2013 | Li | H02J 7/00 320/103 |
| 2013/0187605 A1* | 7/2013 | Potts | H01M 10/425 320/112 |
| 2013/0214733 A1* | 8/2013 | Liang | H02J 5/00 320/108 |
| 2014/0009092 A1* | 1/2014 | Ma | H02J 7/0014 320/108 |
| 2014/0028263 A1* | 1/2014 | Jo | H02J 7/0016 320/128 |
| 2014/0084868 A1* | 3/2014 | Yun | H02J 7/0016 320/118 |
| 2014/0103857 A1* | 4/2014 | Marten | H02J 7/0019 429/61 |
| 2014/0117935 A1* | 5/2014 | Ameziani | H02J 7/0018 320/118 |
| 2014/0266051 A1* | 9/2014 | Hayakawa | H02J 7/0016 320/118 |
| 2015/0236587 A1* | 8/2015 | Kim | G06F 1/32 323/271 |
| 2015/0256020 A1* | 9/2015 | Takai | H02J 7/0019 320/134 |
| 2015/0280579 A1* | 10/2015 | Ishigaki | H02M 3/33507 307/77 |
| 2015/0295428 A1* | 10/2015 | Moussaoui | H02J 7/007184 320/116 |
| 2015/0295429 A1* | 10/2015 | Moussaoui | H02J 7/007184 320/116 |
| 2016/0028241 A1* | 1/2016 | Ichikawa | H02J 50/12 307/104 |
| 2016/0094063 A1* | 3/2016 | Wu | H02J 7/0014 320/112 |
| 2016/0204627 A1* | 7/2016 | Wang | H02J 7/0019 320/118 |
| 2016/0329741 A1* | 11/2016 | Heidenreich | B60L 58/22 |
| 2017/0025867 A1* | 1/2017 | Wang | H02J 7/007182 |
| 2017/0141586 A1* | 5/2017 | Pernyeszi | H01M 10/425 |
| 2017/0141590 A1* | 5/2017 | Tofigh | H02J 7/0014 |
| 2017/0288423 A1* | 10/2017 | Wu | H02J 7/0019 |
| 2018/0115189 A1* | 4/2018 | Heidenreich | H02J 7/0014 |
| 2018/0123356 A1* | 5/2018 | Yang | H02J 7/0014 |
| 2019/0288550 A1* | 9/2019 | Heidenreich | H02J 9/061 |
| 2019/0310321 A1* | 10/2019 | Mi | H02J 7/0014 |
| 2020/0169097 A1* | 5/2020 | Zhang | H02J 7/0014 |
| 2020/0343739 A1* | 10/2020 | Peretz | H02J 7/0018 |
| 2021/0083331 A1* | 3/2021 | Kunimitsu | H01M 10/4207 |
| 2021/0151995 A1* | 5/2021 | Hudson | H02J 7/0047 |
| 2022/0045628 A1* | 2/2022 | Chen | H02J 7/0016 |
| 2022/0085720 A1* | 3/2022 | Ichihashi | H02M 3/24 |
| 2023/0083009 A1* | 3/2023 | Hamada | H01M 10/44 320/116 |
| 2023/0092047 A1* | 3/2023 | Zhang | H02J 9/062 307/66 |
| 2023/0361582 A1* | 11/2023 | Fan | H02J 7/0016 |
| 2024/0088795 A1* | 3/2024 | Huang | H02M 1/14 |
| 2024/0222984 A1* | 7/2024 | Liu | H02J 7/345 |

FOREIGN PATENT DOCUMENTS

| | | | | |
|---|---|---|---|---|
| CN | 105406526 A | * | 3/2016 | ............ H02J 7/0019 |
| CN | 205092599 U | * | 3/2016 | |
| CN | 105762895 A | * | 7/2016 | ............ H02J 7/0013 |
| CN | 107147166 A | * | 9/2017 | ............ H02J 7/0016 |
| CN | 206517117 U | * | 9/2017 | |
| CN | 107785957 A | * | 3/2018 | |
| CN | 107813720 A | * | 3/2018 | ............ B60L 58/12 |
| CN | 108134429 A | * | 6/2018 | |
| CN | 108565931 A | * | 9/2018 | ............ H02J 7/0019 |
| CN | 108667107 A | * | 10/2018 | ........ H01M 10/4207 |
| CN | 109037801 A | * | 12/2018 | ........ H01M 10/0525 |
| CN | 107294174 B | * | 11/2020 | ............ H02J 7/0016 |
| CN | 116094087 A | * | 5/2023 | |
| EP | 2916424 A1 | | 9/2015 | |
| JP | H08214454 A | * | 2/1995 | |
| JP | 2013162661 A | * | 8/2013 | |
| KR | 20170064100 | * | 11/2015 | |
| TW | 201340439 A | * | 10/2013 | |
| WO | 2012172468 A2 | | 12/2012 | |

OTHER PUBLICATIONS

JPH08214454_Machine_Translation. (Year: 1995).*
Extended European Search Report issued on Sep. 26, 2022 for counterpart European patent application No. 19919599.1, 8 pgs.
International Search Report for corresponding International Patent Application No. PCT/CN2019/078967, dated Dec. 13, 2019.

* cited by examiner

ACTIVE EQUALIZER CIRCUIT, BATTERY MANAGEMENT SYSTEM, AND POWER SUPPLY SYSTEM

CROSS-REFERENCE TO RELATED APPLICATIONS

This application is the U.S. national stage of International Patent Application No. PCT/CN2019/078967, filed on Mar. 21, 2019 and entitled ACTIVE EQUALIZATION CIRCUIT, BATTERY MANAGEMENT SYSTEM, POWER SOURCE SYSTEM, AND ELECTRONIC DEVICE. The disclosure of the foregoing application is incorporated herein by reference in its entirety.

TECHNICAL FIELD

The present disclosure relates to the technical field of battery equalization, in particular to an active equalizer circuit, a battery management system, and a power supply system.

BACKGROUND

Battery packs, such as lithium-ion series battery packs, are widely used in electrical equipment such as electric vehicles, notebook computers, and medical devices. Basically it is impossible for two batteries to be identical, even if they are produced by the same production line. Therefore, there are always some differences among battery cells in the battery pack in terms of battery capacity, internal resistance, and self-discharge, which results in inconsistency of voltages of the battery cells. For example, in a series battery pack, when the voltage of one battery cell reaches discharge cut-off voltage, the entire series battery pack will be inhibited from discharging, even though other battery cells may have sufficient voltage. Therefore, the voltage inconsistency among the battery cells may seriously reduce the available capacity and cycle life of the battery pack.

To improve the available capacity and cycle life of the battery pack, there are currently two types of equalizer circuits in the art. Among them, the active equalizer circuit, with the advantages of fast equalizing speed and high efficiency, has become a trend of development. In general, the conventional active equalizer circuits transfer energy from battery cells having higher voltage to battery cells having lower voltage with capacitors, inductors, transformers, and combinations thereof. However, the conventional active equalizer circuits use a large number of metal-oxide-semiconductor field-effect transistor (MOSFET) switches and isolated drivers. In general, the active equalizer circuit comprises at least one or more MOSFET switches, one or more isolated drivers, and one transformer winding for each battery cell, resulting in a high cost and large volume of the active equalizer circuit.

Therefore, it has become an urgent technical problem to reduce the cost and volume of the active equalizer circuit.

SUMMARY

An objective of the present disclosure is to provide an active equalizer circuit, a battery management system, and a power supply system, so as to reduce the cost and volume of the active equalizer circuit.

To achieve the above objective, in one aspect, an embodiment of the present disclosure provides an active equalizer circuit comprising: a plurality of switching transistors coupled to battery cells in a series battery pack on a one-to-one basis, and configured to control on/off of a charging/discharging circuit for the respective battery cells; a driving transformer comprising a first primary winding and a plurality of first secondary windings, with each of the first secondary windings being coupled to a control terminal of a corresponding switching transistor on a one-to-one basis through a driving circuit; a multi-port converter comprising an equalizing transformer and a bridge converter, wherein the equalizing transformer comprises a second primary winding and a plurality of second secondary windings, output terminals of the bridge converter are coupled respectively to the first primary winding and the second primary windings, and each of the second secondary windings is coupled to a corresponding plurality of battery cells in the series battery pack; a buck converter having an input terminal coupled to an output terminal of the series battery pack and an output terminal coupled to an input terminal of the bridge converter; a microcontroller configured to output a first control signal to the buck converter, to make the buck converter transform an output voltage of the series battery pack and output the transformed output voltage to the bridge converter, and output a second control signal to the bridge converter, to control an operation state of the bridge converter.

In another aspect, an embodiment of the present disclosure provides a battery management system. The battery management system comprises an active equalizer circuit, which comprises: a plurality of switching transistors coupled to battery cells in a series battery pack on a one-to-one basis, and configured to control on/off of a charging/discharging circuit for the respective battery cells; a driving transformer comprising a first primary winding and a plurality of first secondary windings, with each of the first secondary windings being coupled to a control terminal of a corresponding switching transistor on a one-to-one basis through a driving circuit; a multi-port converter comprising an equalizing transformer and a bridge converter, wherein the equalizing transformer comprises a second primary winding and a plurality of second secondary windings, output terminals of the bridge converter are coupled respectively to the first primary winding and the second primary windings, and each of the second secondary windings is coupled to a corresponding plurality of battery cells in the series battery pack; a buck converter having an input terminal coupled to an output terminal of the series battery pack and an output terminal coupled to an input terminal of the bridge converter; a microcontroller configured to output a first control signal to the buck converter, to make the buck converter transform an output voltage of the series battery pack and output the transformed output voltage to the bridge converter, and output a second control signal to the bridge converter, to control an operation state of the bridge converter.

In yet another aspect, an embodiment of the present disclosure provides a power supply system comprising a series battery pack and a battery management system. The battery management system comprises an active equalizer circuit, which comprises: a plurality of switching transistors coupled to battery cells in a series battery pack on a one-to-one basis, and configured to control on/off of a charging/discharging circuit for the respective battery cells; a driving transformer comprising a first primary winding and a plurality of first secondary windings, with each of the first secondary windings being coupled to a control terminal of a corresponding switching transistor on a one-to-one basis through a driving circuit; a multi-port converter comprising an equalizing transformer and a bridge converter, wherein the equalizing transformer comprises a second primary winding and a plurality of second secondary windings, output terminals of the bridge converter are coupled respectively to the first primary winding and the second primary windings, and each of the second secondary windings is coupled to a corresponding plurality of battery cells in the series battery pack; a buck converter having an input terminal coupled to an output terminal of the series battery pack and an output terminal coupled to an input terminal of the bridge converter; a microcontroller configured to output a first control signal to the buck converter, to make the buck converter transform an output voltage of the series battery pack and output the transformed output voltage to the bridge converter, and output a second control signal to the bridge converter, to control an operation state of the bridge converter.

In yet another aspect, an embodiment of the present disclosure provides an electrical equipment comprising the power supply system described above.

According to the embodiments provided in the present disclosure, in the active equalizer circuit of the embodiments, each battery cell in the series battery pack needs only one switching transistor, and the secondary winding of the equalizing transformer is shared by a plurality of battery cells. Therefore, as compared with the conventional active equalizer circuit, the circuit volume and cost of the active equalizer circuit of the embodiments are significantly reduced. In addition, in the active equalizer circuit of the embodiments of the present disclosure, the switching transistors are driven synchronously by the bridge converter of the multi-port converter, thereby eliminating the need to provide isolated drivers and isolated power supplies for multiple switching transistors and further reducing costs.

BRIEF DESCRIPTION OF THE DRAWINGS

For clearer illustration of the embodiments in the present disclosure or the prior art, a brief description of the drawings for the embodiments or the prior art will be given below. The drawings described below involve only some embodiments of this disclosure. For those of ordinary skill in the art, other drawings can be derived from these drawings without any inventive efforts. In the drawings.

DETAILED DESCRIPTION

Figure 1:
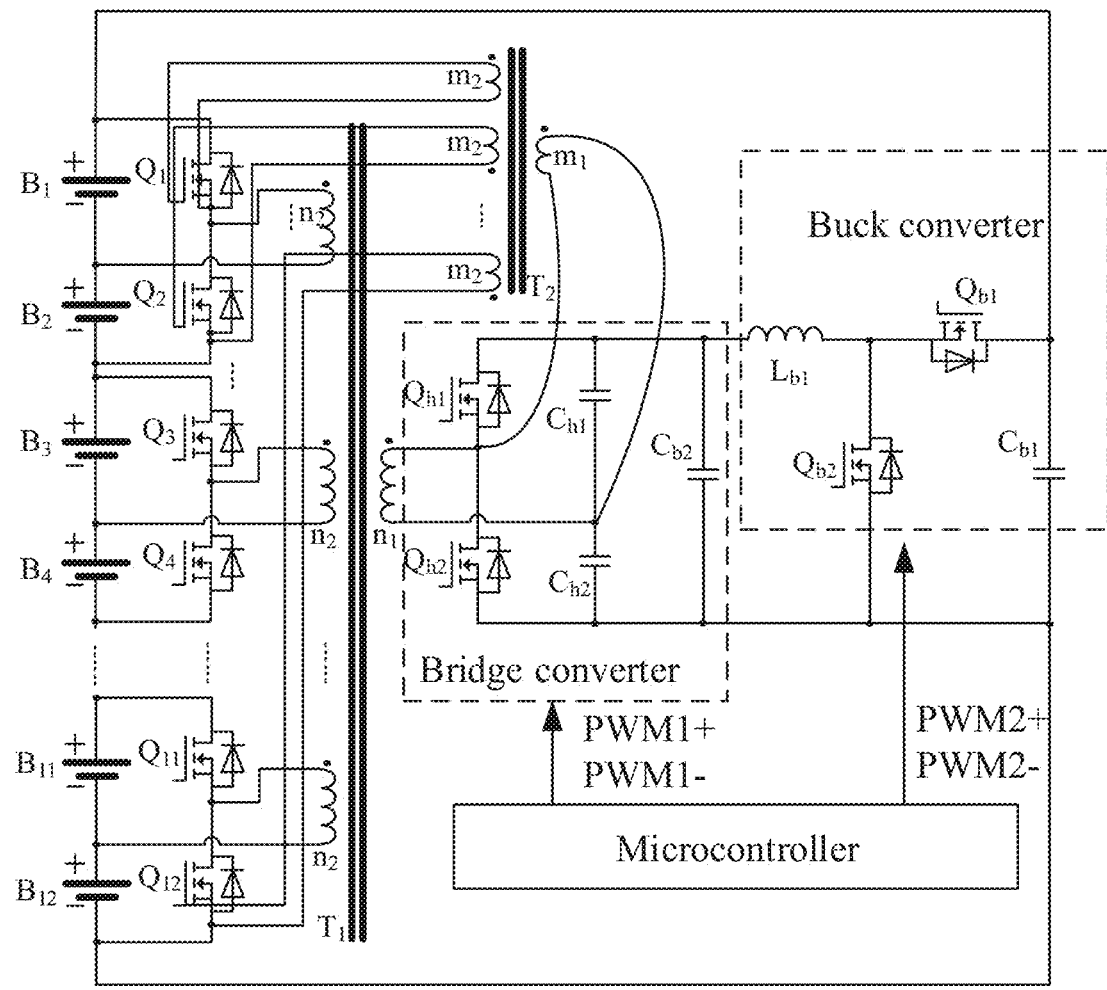
FIG. 1 is a schematic circuit diagram showing an active equalizer circuit in some embodiments of the present disclosure.

For a better understanding of the present disclosure, a clear and complete description of the embodiments of the present disclosure will be set forth with reference to the drawings. The described embodiments are only a part, rather than all, of the embodiments of the present disclosure. All other embodiments derived by persons skilled in the art from the embodiments of the present disclosure without making inventive efforts shall fall within the scope of the present disclosure.

The electrical equipment of an embodiment of this disclosure may be provided with a power supply system. The power supply system may include a series battery pack and a battery management system. The series battery pack can provide the electrical equipment with electric energy for normal operation. In some exemplary embodiments of the present disclosure, the electrical equipment may comprise, but is not limited to, an electric automobile, an electric motorcycle, an electric bicycle, electric hover board, a medical device, a portable electronic device, and the like. Among them, the portable electronic device may be, for example, a tablet computer, a notebook computer, a smart phone or a smart wearable device, or the like.

In an embodiment of the present disclosure, the power supply system may be provided within or outside the electrical equipment. In an exemplary embodiment of the present disclosure, for example, the power supply system may be incorporated into an electric automobile to form a part of the electric automobile. For another example, in another exemplary embodiment of this disclosure, an uninterruptible power supply (UPS) may be externally attached to a medical device to form an electrical accessory of the medical device.

In some embodiments of the present disclosure, the term "series battery pack" refers to a battery pack that is generally connected in series, i.e., it is not limited to that all battery cells in the series battery pack are connected in series, instead, a part of the battery cells can be connected in parallel or in a combination of series and parallel. In addition, in some embodiments of the present disclosure, the battery cells in the series battery pack may be all rechargeable batteries. The rechargeable battery may be, for example, a nickel-cadmium battery, a nickel-hydrogen battery, a lithium-ion battery, or a lead battery, etc.

In the embodiment of the present disclosure, generally the battery management system may manage the series battery pack to prevent the series battery pack from abnormal conditions such as over-discharge, overcharge, over temperature, etc., so as to improve the performance of the series battery pack. In some embodiments of the present disclosure, the battery management system may comprise an active equalizer circuit, which can suppress the inconsistence among the battery cells in the series battery pack within an acceptable range, thereby ensuring that each battery cell remains in the same state during normal use, so as to improve the available capacity and cycle life of the series battery pack.

To reduce the cost and volume of the active equalizer circuit, improvement is made to the conventional active equalizer circuit in the embodiments of this disclosure. In some embodiments of the present disclosure, the improved active equalizer circuit may comprise a plurality of switching transistors (such as Q1 to Q12 in FIG. 1), a driving transformer (such as T2 in FIG. 1), a multi-port converter (such as the equalizing transformer T1 and the bridge converter in FIG. 1), a buck converter, and a microcontroller.

In some embodiments of the present disclosure, the plurality of switching transistors may be coupled to the battery cells in the series battery pack (such as B1 to B12 in FIG. 1) on a one-to-one basis, that is, each switching transistor may be connected in series to a charging/discharging circuit for a corresponding battery cell to control it's on/off, such that each battery cell may need only one switching transistor. Here, the number of the switching transistors may be determined according to the number of the battery cells in the series battery pack (such as B1 to B12 in FIG. 1). It should be understood that using an N-channel enhanced MOS transistor as the switching transistor in FIG. 1 is just an example and that in other embodiments of this disclosure, other types of MOS transistors or bipolar junction transistors (BJT) may also be used as the switching transistor according to practical needs.

In some embodiments of the present disclosure, the driving transformer (such as T2 in FIG. 1) may comprise a first primary winding $m_1$ and a plurality of first secondary windings $m_2$. Each of the first secondary windings may be coupled to a control terminal (such as the gate and source electrodes of Q1 to Q12 in FIG. 1) of a corresponding switching transistor on a one-to-one basis through a driving circuit to drive the corresponding switching transistor. Thus, the driving transformer, such as T2 in FIG. 1, can play a role in voltage transformation and isolation.

Figure 3:
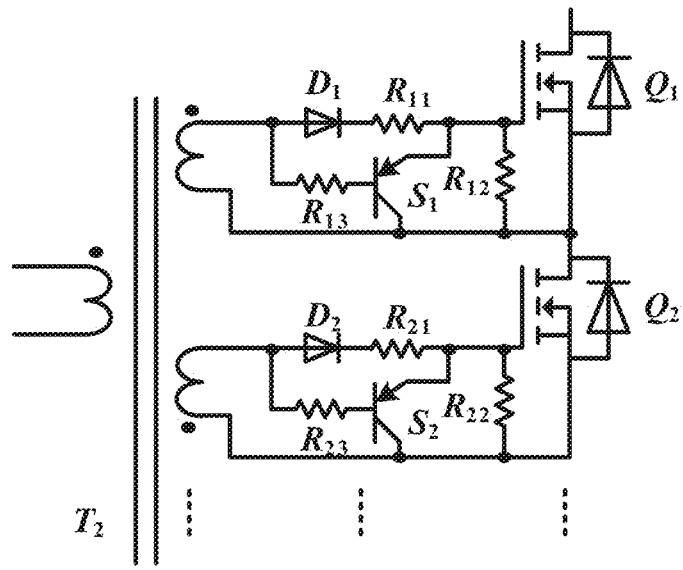
FIG. 3 is a schematic circuit diagram showing a driving circuit in an embodiment of the present disclosure.

In an exemplary embodiment of the present disclosure, the structure of the driving circuit may be, for example, configured as shown in FIG. 3. In FIG. 3, each driving circuit may comprise one PNP triode (S1, S2), one diode (D1, D2), and three resistors (R11, R12, R13, R21, R22, R23). Each driving circuit can drive the corresponding switching transistor by charging/discharging the gate and source capacitors of the corresponding switches. In other embodiments of the present disclosure, other driving circuits may be used according to practical requirements, and the present disclosure is not limited in this aspect.

In some embodiments of the present disclosure, the equalizing transformer (such as T1 in FIG. 1) of the multi-port converter may comprise a second primary winding $n_1$ and a plurality of second secondary windings $n_2$. Each of the second secondary windings may be coupled to a plurality of battery cells in the series battery pack, that is, each of the second secondary windings may be corresponding to two or more battery cells, e.g., in FIG. 1, each second secondary winding may be coupled to two battery cells, in other words, two battery cells share one second secondary winding. Thus as compared with the conventional active equalizer circuit, the number of transformer windings of the active equalizer circuit in the embodiment of the present disclosure can be significantly reduced, thereby effectively reducing the volume and cost of the active equalizer circuit.

In some embodiments of the present disclosure, an input terminal of the buck converter may be coupled to an output terminal of the series battery pack, and an output terminal of the buck converter may be coupled to an input terminal of the bridge converter, so that the buck converter can reduce an output voltage of the series battery pack and then input it to the multi-port converter. In an exemplary embodiment of the present disclosure, the buck converter can reduce the output voltage of the series battery pack to within a range withstandable to the battery cell, avoiding over-voltage from damaging the serial battery pack. It should be understood that the buck converter described above is not limited to the structure shown in FIG. 1, and a buck converter with other structures or a circuit module with a buck conversion function, such as a Buck-Boost circuit, can also be used as required, and the present disclosure is not limited in this aspect.

In some embodiments of the present disclosure, an output terminal of the bridge converter may be coupled to the first primary winding and the second primary winding, respectively. Thus, by coupling the output terminal of the bridge converter to the second primary winding, the electric energy acquired by the buck converter from the series battery pack can be supplied through the second primary winding to the battery cells in the series battery pack that need to be equalized. And by coupling the output terminal of the bridge converter to the first primary winding, a plurality of switching transistors (such as Q1 to Q12 in FIG. 1) can be driven synchronously and directly by a multi-port half-bridge-converted bridge converter, thereby eliminating the need to provide the plurality of switching transistors with isolated drivers and isolated power supplies, further reducing costs and simplifying control.

In some embodiments of the present disclosure, the bridge converter of the multi-port converter may be a half-bridge converter as exemplified in FIG. 1 or a full-bridge converter. However, for those skilled in the art, other rectifying and filtering circuits may also be used as the bridge converter according to practical needs, and the present disclosure is not limited in this aspect.

In some embodiments of the present disclosure, the microcontroller may output a first control signal, such as pulse width modulation (PWM) signals in complementary states as shown by PWM1+ and PWM1− in FIG. 1, to the buck converter to control the buck converter to transform an output voltage of the series battery pack and output the transformed output voltage to the bridge converter. The microcontroller may also output a second control signal, such as pulse width modulation signals in complementary states as shown by PWM2+ and PWM2− in FIG. 1, to the bridge converter to control the operation state of the bridge converter. In some exemplary embodiments, the microcontroller may comprise but is not limited to, a single chip computer, a microcontroller unit (MCU), a digital signal processor (DSP), a programmable logic controller (PLC), and so on.

In the above embodiments of the present disclosure, it can be seen that each battery cell in the series battery pack needs only one switching transistor for controlling the on/off of the charging/discharging circuit, and each of the second secondary windings is coupled to the corresponding plurality of battery cells of the series battery pack, i.e. the plurality of battery cells may share one second secondary winding. Thus, as compared with the conventional active equalizer circuit, the number of switching transistors and the number of transformer windings of the active equalizer circuit in the above-described embodiments of the present disclosure are greatly reduced, thereby effectively reducing the volume and cost of the active equalizer circuit. In addition, in the above-described embodiments of the disclosure, the output terminal of the bridge converter can be coupled to the first primary winding and the second primary windings respectively, so that the switching transistors can be driven synchronously and directly by the bridge converter, thereby eliminating the need to provide isolated drivers and isolated power supplies for driving the switching transistors, which are needed in the conventional active equalizer circuits, and further reducing costs and simplifying control.

Figure 4A:
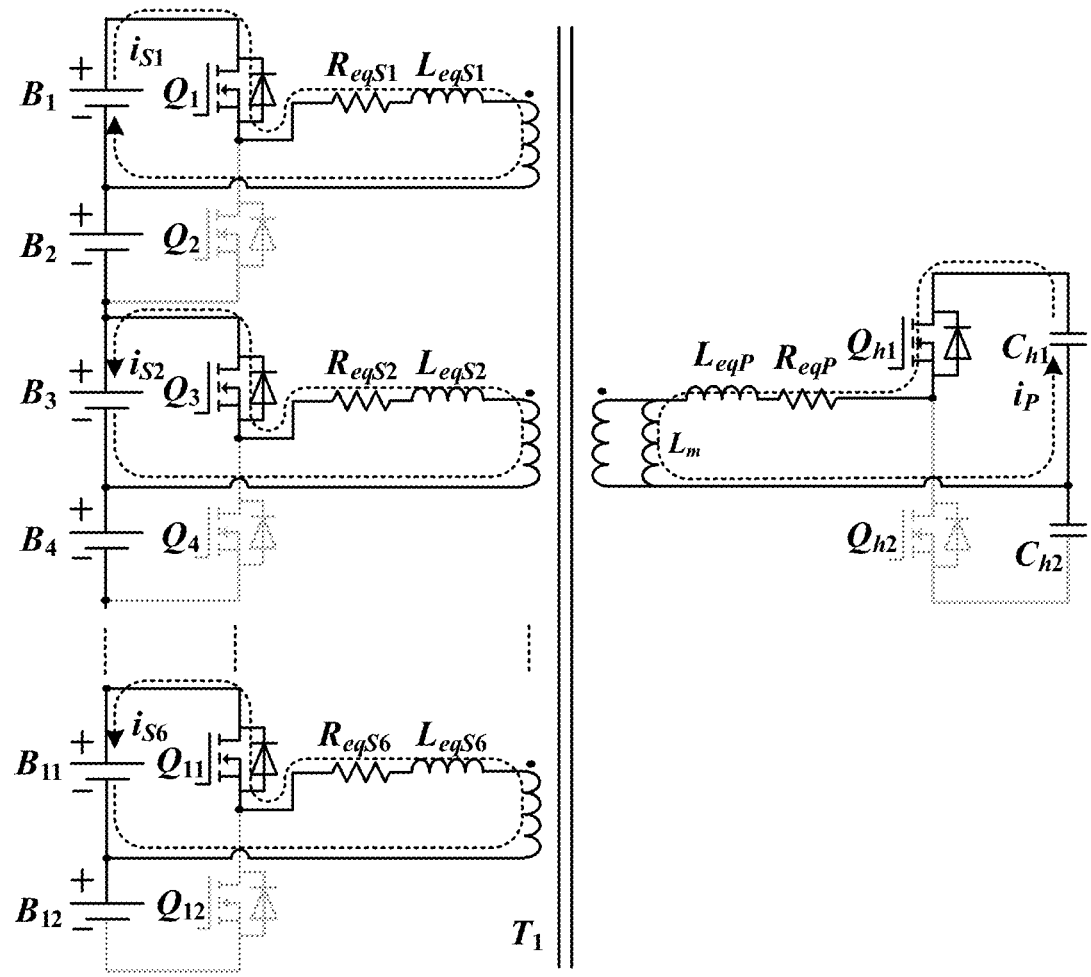
FIG. 4a is a schematic diagram showing equalization by the multi-port converter in operation state I according to an embodiment of the present disclosure.
Figure 4B:
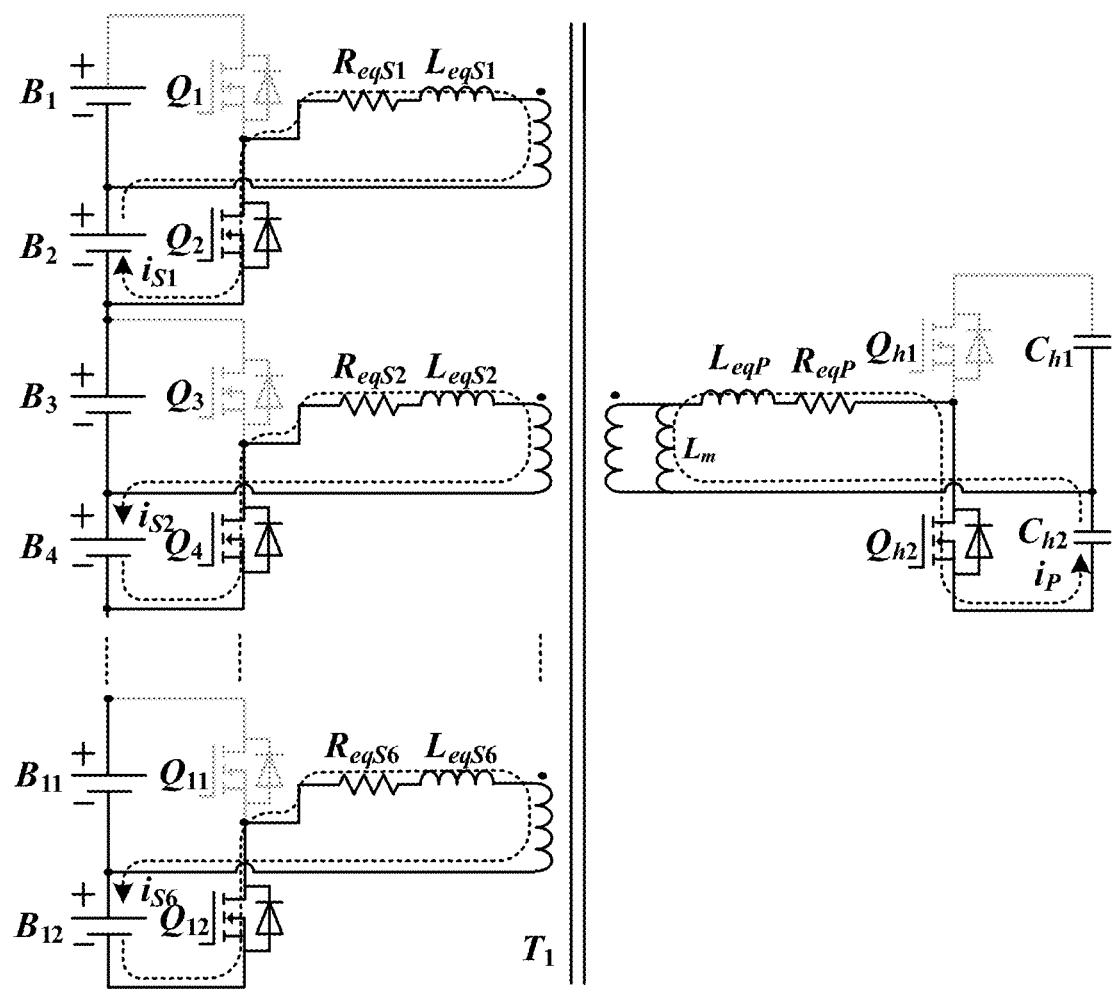
FIG. 4b is a schematic diagram showing equalization by the multi-port converter in operation state II according to an embodiment of the present disclosure.

In some embodiments of the present disclosure, each of the second secondary windings of the multi-port converter may be coupled to a corresponding filter circuit, e.g., as illustrated by the secondary side of the equalizing transformer T1 in FIGS. 4a and 4b, so as to convert the pulsating direct current output by the second secondary winding into direct current. Similarly, the output terminal of the bridge converter of the multi-port converter is also coupled to a corresponding filter circuit, e.g., as illustrated by the primary side of the equalizing transformer T1 in FIGS. 4a and 4b, so as to convert the pulsating direct current output by the output terminal of the bridge converter into direct current.

To facilitate understanding, the operation principle of the active equalizer circuit in an embodiment of the present disclosure will be described below with reference to FIGS. 1, 3, 4a, 4b, 5a and 5b.

Figure 2:
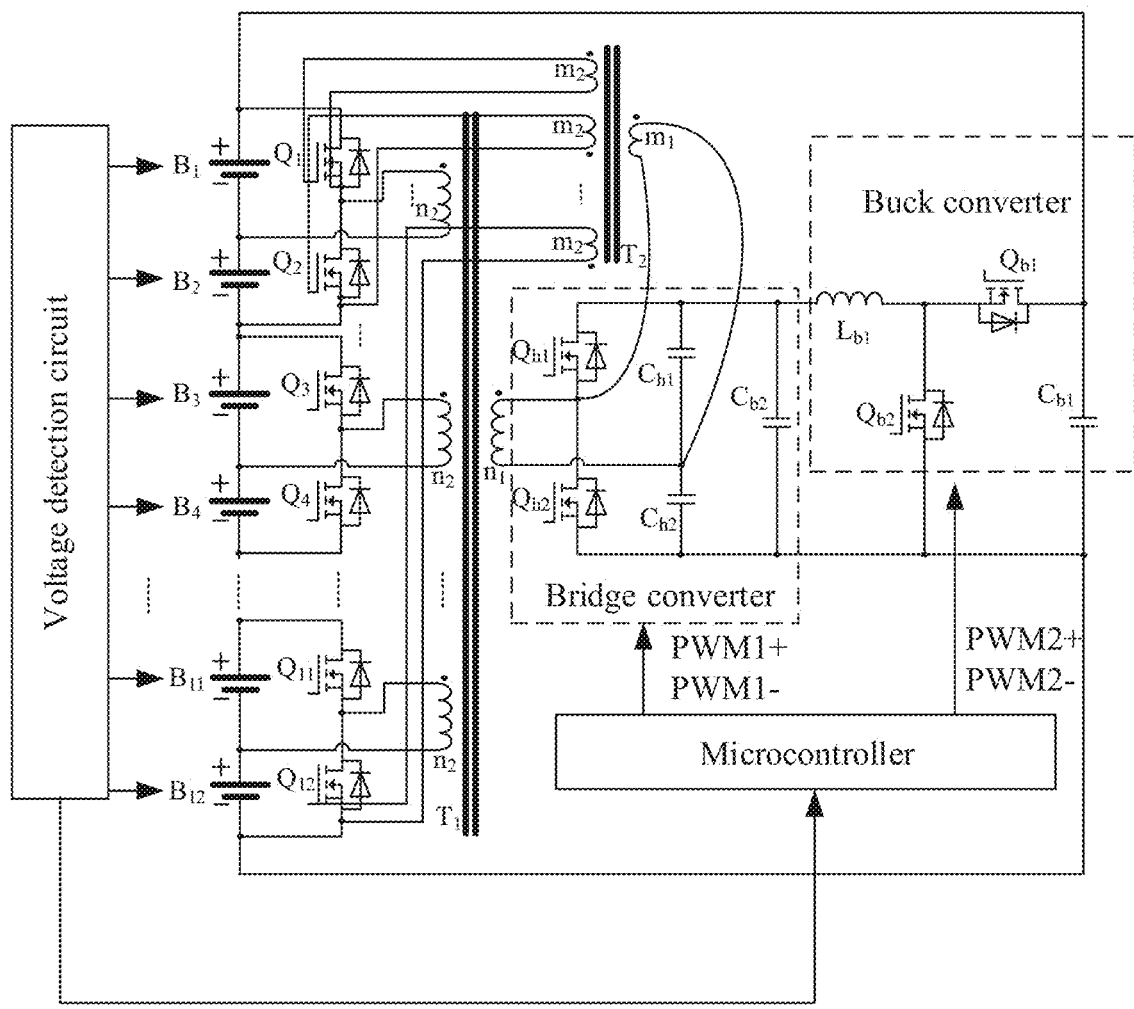
FIG. 2 is another schematic circuit diagram showing an active equalizer circuit in some other embodiments of the present disclosure.
Figure 5A:
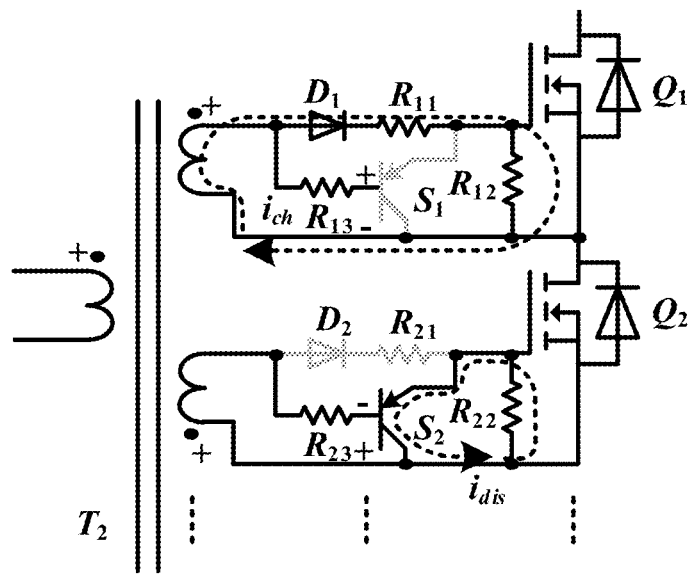
FIG. 5a is a schematic diagram showing driving by the driving circuit in operation state I according to an embodiment of the present disclosure.

The active equalizer circuit shown in FIG. 1 has two stable operation states, i.e., operation state I and operation state II, in one switching cycle. Specifically:

In the operation state I: referring to FIGS. 2 and 4a, when the upper MOS transistor Qh1 of the bridge converter is turned on and the lower MOS transistor Qh2 is turned off, the namesake ends of the equalizing transformer T1 and the driving transformer T2 are positive, the triodes S1, S3, ..., S11 connected to odd-numbered MOSFET switching transistors Q1, Q3, ..., Q11 for the series battery pack are controlled to be turned on, and the triodes S2, S4, ..., S12 connected to even-numbered MOSFET switching transistors Q2, Q4, ..., Q12 for the series battery pack are controlled to be turned off. Accordingly, as shown in FIG. 5a, the odd-numbered first secondary windings of the driving transformer T2 charge the gate-source capacitors of the odd-numbered MOSFET switching transistors Q1, Q3, ..., Q11 via the diodes D1, D3, ..., D11, and meanwhile the gate-source capacitors of the even-numbered MOSFET switching transistors Q2, Q4, ..., Q12 are discharged via the triodes S2, S4, ..., S12. Therefore, the odd-numbered MOSFET switching transistors Q1, Q3, ..., Q11 are turned on, and the even-numbered MOSFET switching transistors Q2, Q4, ..., Q12 are turned off. Thus, energy transfer from the upper capacitor Ch1 of the bridge converter to the odd-numbered battery cells B1, B3, ..., B11 is realized based on the forward conversion. In addition, the equalization current is related to the voltage of the battery cell, the higher the voltage of the battery cell is, the smaller or even negative the equalization current is, and the lower the voltage of the battery cell is, the larger the equalization current is, thus, the automatic equalization of the odd-numbered battery cells can be realized.

Figure 5B:
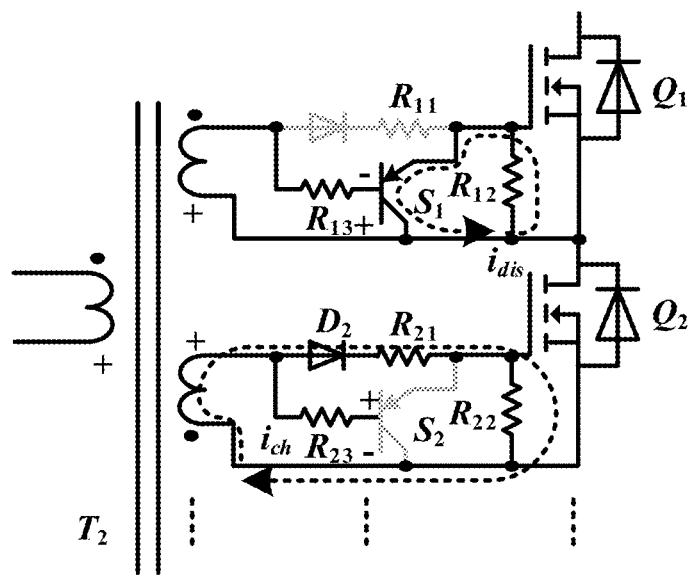
FIG. 5b is a schematic diagram showing driving by the driving circuit in operation state II according to an embodiment of the present disclosure.

In the operation state II: referring to FIGS. 1 and 4b, when the lower MOS transistor Qh2 of the bridge converter is turned on and the upper MOS transistor Qh1 is turned off, the namesake ends of the equalizing transformer T1 and the driving transformer T2 are negative, and the other ends thereof are positive. The triodes S2, S4, ..., S12 connected to even-numbered MOSFET switching transistors Q2, Q4, ..., Q12 for the series battery pack are controlled to be turned on, and the triodes S1, S3, ..., S11 connected to odd-numbered MOSFET switching transistors Q1, Q3, ..., Q11 for the series battery pack are controlled to be turned off. Accordingly, as shown in FIG. 5b, the even-numbered first secondary windings of the driving transformer T2 charge the gate-source capacitors of the even-numbered MOSFET switching transistors Q2, Q4, ..., Q12 via the diodes D2, D4, ..., D12, and meanwhile the gate-source capacitors of the odd-numbered MOSFET switching transistors Q1, Q3, ..., Q11 are discharged via the triodes S1, S3, ..., S11. Therefore, the even-numbered MOSFET switching transistors Q2, Q4, ..., Q12 are turned on, and the odd-numbered MOSFET switching transistors Q1, Q3, ..., Q11 are turned off. Thus, energy transfer from the lower capacitor Ch2 of the bridge converter to the even-numbered battery cells B2, B4, ..., B12 is realized based on the forward conversion, thus, the automatic equalization of the even-numbered battery cells can be realized.

Since the voltages at the upper and lower capacitors of the bridge converter are equal, active equalization between the odd-numbered and even-numbered battery cells is achieved through the alternation of the two states.

In some embodiments of the present disclosure, as shown in FIG. 2, the active equalizer circuit may further comprise a multi-channel voltage detection circuit which may be configured to detect the battery voltage of each battery cell in the series battery pack. Correspondingly, the microcontroller is further configured to determine the voltage difference among the battery cells based on the battery voltage, and adjust the output first control signal according to the voltage difference, to correspondingly adjust the duty cycle of the buck converter.

When the voltage difference among the battery cells is large, the output first control signal may be adjusted appropriately to increase the duty cycle of the buck converter, so as to increase the equalization current, thereby improving the equalization speed and efficiency effectively. When the voltage difference among the battery cells is small, the output first control signal may be adjusted appropriately to reduce the duty cycle of the buck converter, so as to reduce the equalization current, thereby realizing a more accurate equalization among the battery cells and prolonging the life cycle of the series battery pack.

It can be seen that the voltage difference among the battery cells is in positive correlation with the duty cycle of the buck converter, and is in inverse correlation with the equalization current. When the equalization current is reduced to zero or close to zero, it indicates that there is no voltage difference among the battery cells or the voltage difference approaches zero, and that active equalization of any battery cells in the series battery pack is achieved. In addition, in some embodiments of the present disclosure, the magnitude of the equalization current is adjusted by controlling the duty cycle of the buck converter, which also serves to adapt to different power supply systems.

Figure 6:
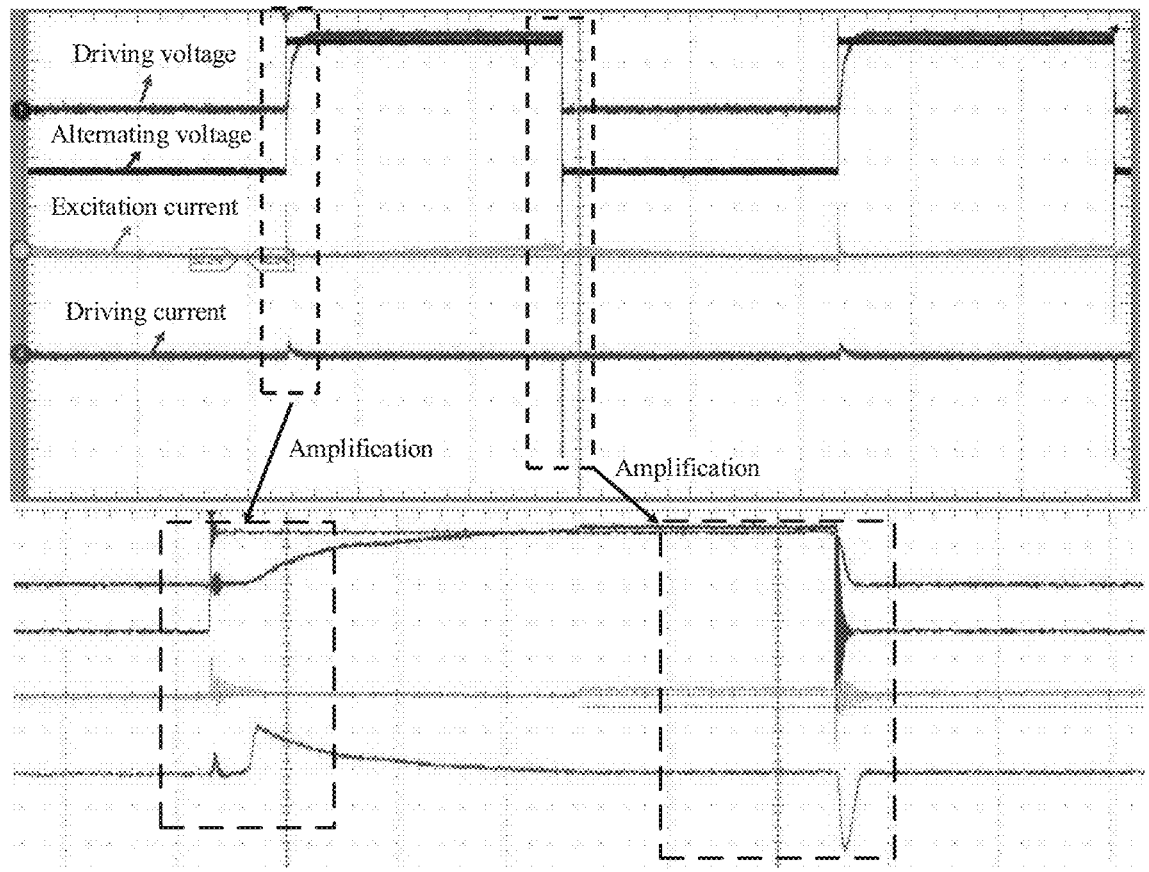
FIG. 6 is a schematic diagram showing waveforms of a driving voltage, a driving current and an excitation current of the multi-port converter according to an embodiment of the present disclosure.

As an exemplary embodiment of this disclosure, FIG. 6 schematically shows waveforms of driving voltage, driving current, and excitation current of the multi-port converter operating at 10 kHz. It can be seen that the driving voltage of the odd-numbered MOSFET switching transistors varies following the change of alternating voltage of the bridge converter of the multi-port converter. Due to the leakage inductance of the driving transformer T2 and the influence of the current limiting resistor (e.g. R11), the driving voltage slightly lags behind the AC voltage.

The charging current for the gate-source capacitor of the MOSFET peaks 0.24 A when the AC voltage transits from negative to positive. The discharging current of the gate-source capacitor of the MOSFET peaks 0.4 A when the AC voltage transits from positive to negative, due to a direct short circuit of the gate-source capacitor. Wherein, the excitation current is approximately a triangular waveform. However, due to the charging of the gate-source capacitor of the MOSFET, a spike of 0.2 A is superimposed on the excitation current waveform when the AC voltage transits.

Figure 7:
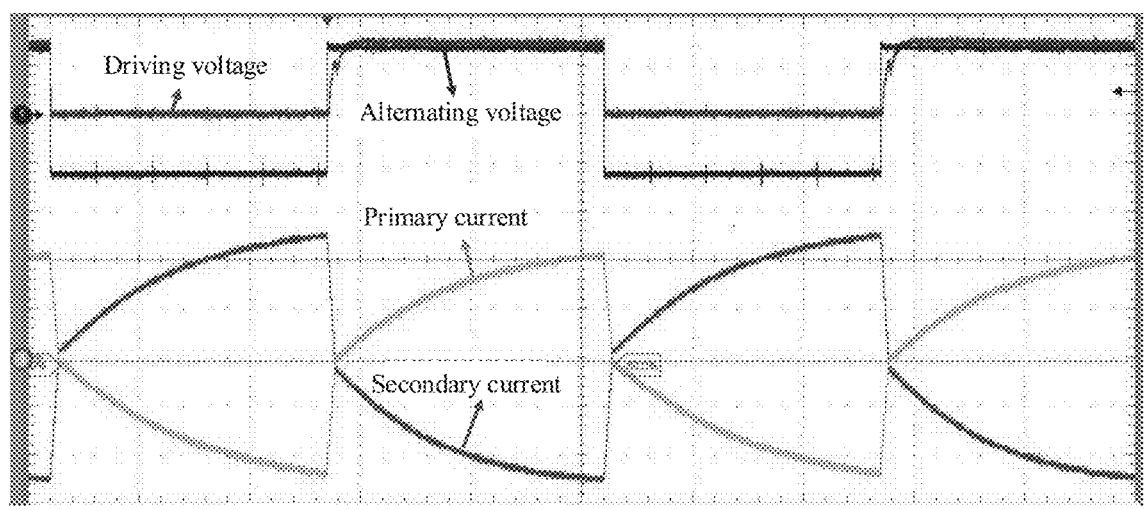
FIG. 7 is a schematic diagram showing waveforms of a primary side current and a secondary side current of the multi-port converter according to an embodiment of the present disclosure.

As an exemplary embodiment of this disclosure, FIG. 7 shows waveforms of equalization currents at the primary side and the secondary side of the multi-port converter operating at 10 kHz. It can be seen that since the equalization is mainly based on a forward conversion, the equalization current increases almost exponentially from zero in each half switching cycle due to the influence of leakage inductance and equivalent resistance. The peak current at the primary side and the peak current at the secondary side are measured to be 0.7 A and 2.56 A respectively.

Figure 8A:
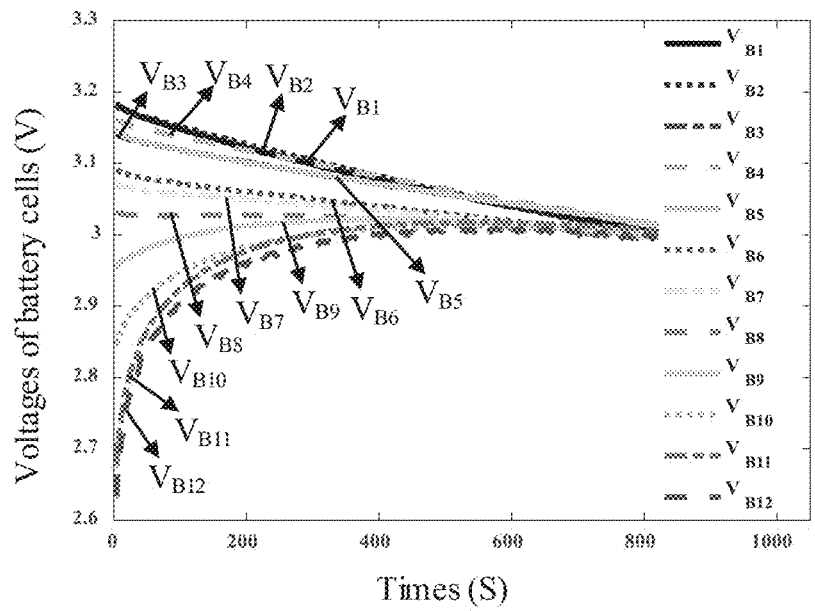
FIG. 8a shows the effect of cell voltage equalization of the battery cells in the series battery pack according to an embodiment of the present disclosure.
Figure 8B:
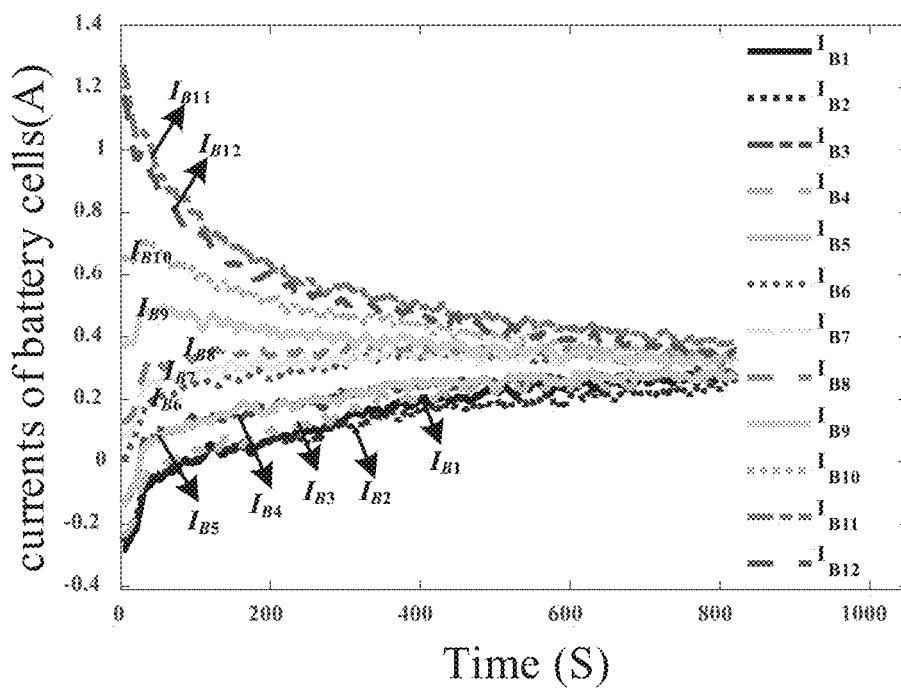
FIG. 8b shows the effect of cell current equalization of the battery cells in the series battery pack according to an embodiment of the present disclosure.

As an exemplary embodiment of this disclosure, FIGS. 8a and 8b show the result of equalization for 12 battery cells in the series battery pack shown in FIG. 1. As shown in FIG. 8a, voltages of all battery cells are equalized toward an average value simultaneously. The equalizer circuit discharges the battery cells with higher voltage and charges the battery cells with lower voltage. As shown in FIG. 8b, the equalization current of the battery cells has the same change tendency. It can be seen that the equalization current of the battery cells is dependent on the voltage of the battery cells. At the beginning of the equalization, the maximum equalization current of the battery cells is 1.3 A, and the total equalization current of the 12 battery cells is 6 A. About 800 seconds later, the voltages of all battery cells are equalized to 3 V.

For convenience of description, the above-described devices are broken down into various units by functionality. However, the functions of the various units may be realized in one or more hardware elements when implementing the present disclosure.

In this disclosure, the embodiments are described progressively, with the focus being put on differences from other embodiments. For the same or similar parts among the various embodiments, reference may be made to each other.

Described above is merely exemplary embodiments of the present disclosure, and is not meant to limit the present disclosure. Various modifications and variations may be made to the present disclosure by those skilled in the art. Any modifications, alternations, improvements, etc., made by those skilled in the art without departing from the concepts and principles of this disclosure shall fall within the scope of the claims.

What is claimed is:

1. An active equalizer circuit comprising:
    a plurality of switching transistors coupled respectively to battery cells in a series battery pack on a one-to-one basis, and configured to control on/off of a charging/discharging circuit for the respective battery cells;
    a driving transformer comprising a first primary winding and a plurality of first secondary windings, with each of the first secondary windings being coupled to a control terminal of a corresponding switching transistor on a one-to-one basis through a driving circuit;
    a multi-port converter comprising an equalizing transformer and a bridge converter, wherein the equalizing transformer comprises a second primary winding and a plurality of second secondary windings, output terminals of the bridge converter are coupled respectively to the first primary winding and the second primary winding, and each of the second secondary windings is coupled to a corresponding plurality of battery cells in the series battery pack;
    a buck converter having an input terminal coupled to an output terminal of the series battery pack and an output terminal coupled to an input terminal of the bridge converter; and
    a microcontroller configured to output a first control signal to the buck converter, to make the buck converter transform an output voltage of the series battery pack and output the transformed output voltage to the bridge converter, and configured to output a second control signal to the bridge converter, to control an operation state of the bridge converter,
    wherein the bridge converter comprises a first capacitor, a second capacitor, a third capacitor and two field effect transistors;
    the first capacitor is coupled across the output terminals of the buck converter at the input terminals of the bridge converter, the second capacitor and the third capacitor are connected in series across the terminals of the first capacitor, and the two field effect transistors are connected in series across the terminals of the first capacitor; and
    the node between the two field effect transistors and the node between the second and third capacitors form the output terminals of the bridge converter.

2. The active equalizer circuit according to claim 1, wherein each of the second secondary windings is coupled to a corresponding filter circuit.

3. The active equalizer circuit according to claim 1, wherein the output terminal of the bridge converter is coupled to a corresponding filter circuit.

4. The active equalizer circuit according to claim 1, wherein:
    the bridge converter comprises a half-bridge converter;
    the node between the two field effect transistors is a first output terminal of the bridge converter, and the node between the second and third capacitors is a second output terminal of the bridge converter; and
    two terminals of the first primary winding are coupled respectively to the first and second output terminals of the bridge converter, and two terminals of the second primary winding are coupled respectively to the first and second output terminals of the bridge converter.

5. The active equalizer circuit according to claim 1, wherein each of the second secondary windings is coupled to two corresponding battery cells in the series battery pack.

6. The active equalizer circuit according to claim 1, further comprising:
    a multi-channel voltage detection circuit configured to detect a battery voltage of each of the battery cells in the series battery pack,
    wherein the microcontroller is further configured to determine a voltage difference among the battery cells based on the battery voltage, and adjust the first control signal according to the voltage difference, to adjust a duty cycle of the buck converter.

7. The active equalizer circuit according to claim 6, wherein the voltage difference is in positive correlation with the duty cycle.

8. A battery management system comprising an active equalizer circuit, wherein the battery management system comprises:

a plurality of switching transistors coupled to battery cells in a series battery pack on a one-to-one basis, and configured to control on/off of a charging/discharging circuit for the respective battery cells;

a driving transformer comprising a first primary winding and a plurality of first secondary windings, with each of the first secondary windings being coupled to a control terminal of a corresponding switching transistor on a one-to-one basis through a driving circuit;

a multi-port converter comprising an equalizing transformer and a bridge converter, wherein the equalizing transformer comprises a second primary winding and a plurality of second secondary windings, output terminals of the bridge converter are coupled respectively to the first primary winding and the second primary windings, and each of the second secondary windings is coupled to a corresponding plurality of battery cells in the series battery pack;

a buck converter having an input terminal coupled to an output terminal of the series battery pack and an output terminal coupled to an input terminal of the bridge converter; and a microcontroller configured to output a first control signal to the buck converter, to make the buck converter transform an output voltage of the series battery pack and output the transformed output voltage to the bridge converter, and configured to output a second control signal to the bridge converter, to control an operation state of the bridge converter, wherein the bridge converter comprises a first capacitor, a second capacitor, a third capacitor and two field effect transistors;

the first capacitor is coupled across the output terminals of the buck converter at the input terminals of the bridge converter, the second capacitor and the third capacitor are connected in series across the terminals of the first capacitor, and the two field effect transistors are connected in series across the terminals of the first capacitor; and the node between the two field effect transistors and the node between the second and third capacitors form the output terminals of the bridge converter.

9. The battery management system according to claim 8, wherein each of the second secondary windings is coupled to a corresponding filter circuit.

10. The battery management system according to claim 8, wherein the output terminal of the bridge converter is coupled to a corresponding filter circuit.

11. The battery management system according to claim 8, wherein:
the bridge converter comprises a half-bridge converter,
the node between the two field effect transistors is a first output terminal of the bridge converter, and the node between the second and third capacitors is a second output terminal of the bridge converter, and
two terminals of the first primary winding are coupled respectively to the first and second output terminals of the bridge converter, and two terminals of the second primary winding are coupled respectively to the first and second output terminals of the bridge converter.

12. The battery management system according to claim 8, wherein each of the second secondary windings is coupled to two corresponding battery cells in the series battery pack.

13. The battery management system according to claim 8, wherein the active equalizer circuit further comprises:

a multi-channel voltage detection circuit configured to detect a battery voltage of each of the battery cells in the series battery pack respectively, wherein the microcontroller is further configured to determine a voltage difference among the battery cells based on the battery voltage, and adjust the first control signal according to the voltage difference to adjust a duty cycle of the buck converter.

14. The battery management system according to claim 13, wherein the voltage difference is in positive correlation with the duty cycle.

15. A power supply system comprising a series battery pack and a battery management system, wherein the battery management system comprises an active equalizer circuit, and wherein the active equalizer circuit comprises:

a plurality of switching transistors coupled respectively to battery cells in the series battery pack on a one-to-one basis, and configured to control on/off of a charging/discharging circuit for the respective battery cells;

a driving transformer comprising a first primary winding and a plurality of first secondary windings, wherein each of the first secondary windings is coupled to a control terminal of a corresponding switching transistor on a one-to-one basis through a driving circuit;

a multi-port converter comprising an equalizing transformer and a bridge converter, wherein the equalizing transformer comprises a second primary winding and a plurality of second secondary windings, output terminals of the bridge converter are coupled respectively to the first primary winding and the second primary windings, and each of the second secondary windings is coupled to a corresponding plurality of battery cells in the series battery pack;

a buck converter having an input terminal coupled to an output terminal of the series battery pack and an output terminal coupled to an input terminal of the bridge converter; and a microcontroller configured to output a first control signal to the buck converter, to make the buck converter transform an output voltage of the series battery pack and output the transformed output voltage to the bridge converter, and configured to output a second control signal to the bridge converter, to control an operation state of the bridge converter, wherein the bridge converter comprises a first capacitor, a second capacitor, a third capacitor and two field effect transistors;

the first capacitor is coupled across the output terminals of the buck converter at the input terminals of the bridge converter, the second capacitor and the third capacitor are connected in series across the terminals of the first capacitor, and the two field effect transistors are connected in series across the terminals of the first capacitor; and the node between the two field effect transistors and the node between the second and third capacitors form the output terminals of the bridge converter.

16. The power supply system according to claim 15, wherein each of the second secondary windings is coupled to a corresponding filter circuit.

17. The power supply system according to claim 15, wherein the output terminal of the bridge converter is coupled to a corresponding filter circuit.

18. The power supply system according to claim 15, wherein;
the bridge converter comprises a half-bridge converter, the node between the two field effect transistors is a first output terminal of the bridge converter, and the node between the second and third capacitors is a second output terminal of the bridge converter, and two terminals of the first primary winding are coupled respectively to the first and second output terminals of the bridge converter, and two terminals of the second primary winding are coupled respectively to the first and second output terminals of the bridge converter.

19. The power supply system according to claim 15, wherein each of the second secondary windings is coupled to two corresponding battery cells in the series battery pack.

20. The power supply system according to claim 15, wherein the active equalizer circuit further comprises:
a multi-channel voltage detection circuit configured to detect a battery voltage of each of the battery cells in the series battery pack,
wherein the microcontroller is further configured to determine a voltage difference among the battery cells based on the battery voltage, and adjust the first control signal according to the voltage difference, to adjust a duty cycle of the buck converter.

21. The power supply system according to claim 20, wherein the voltage difference is in positive correlation with the duty cycle.

* * * * *